United States Patent [19]

Kajiwara

[11] Patent Number: 5,133,642
[45] Date of Patent: Jul. 28, 1992

[54] PIPE JOINT FOR PUMP

[75] Inventor: Kenichi Kajiwara, Kanagawa, Japan

[73] Assignee: Ebara Corporation, Tokyo, Japan

[21] Appl. No.: 571,541

[22] PCT Filed: Feb. 28, 1989

[86] PCT No.: PCT/JP89/00207
§ 371 Date: Aug. 24, 1990
§ 102(e) Date: Aug. 24, 1990

[87] PCT Pub. No.: WO89/08195
PCT Pub. Date: Sep. 8, 1989

[30] Foreign Application Priority Data

Feb. 29, 1988 [JP] Japan .................. 63-25172[U]

[51] Int. Cl.5 .................................. F01D 25/24
[52] U.S. Cl. ................... 415/215.1; 415/182.1; 415/206; 285/412; 403/337
[58] Field of Search ............... 415/182.1, 200, 203, 415/206, 215.1; 403/336, 337; 285/368, 412

[56] References Cited

U.S. PATENT DOCUMENTS 5,040,947  8/1991  Kajiwara et al. .................. 415/206

FOREIGN PATENT DOCUMENTS 0025070   3/1981  European Pat. Off. .......... 285/368
2203809   8/1973  Fed. Rep. of Germany ...... 285/368
2261367   6/1974  Fed. Rep. of Germany ...... 285/368
2451759   5/1976  Fed. Rep. of Germany ...... 285/368
2807444   8/1979  Fed. Rep. of Germany ...... 285/412
59-160893 10/1984 Japan .
61-181897 11/1986 Japan .

OTHER PUBLICATIONS

PCT/DE86/00188 WO, A1, 86/06800 (Klein, Schanzlin & Beckr Aktiengesellschaft) Nov. 20, 1986.

Primary Examiner—Edward K. Look
Assistant Examiner—Christopher M. Verdier
Attorney, Agent, or Firm—Nikaido, Marmelstein, Murray & Oram

[57] ABSTRACT

A pipe joint for a pump including a pump casing having a pipe connecting flange, comprising a flange body produced from a steel plate such that the inner peripheral portion thereof that defines a water passage is extended toward the casing body and secured by welding to an outlet/inlet opening in the casing body directly or through a cylindrical member, the flange body having a plurality of bolt holes provided in a flange face thereof, and a retainer plate being installed in such a manner as to abut against the reverse side of the flange face, the retainer plate having an annular rib with a square outer shape and a U-shaped cross section which projects toward the casing body, the annular rib being provided in the bottom of the U-shaped cross section with a plurality of bolt holes respectively corresponding to the bolt holes, the retainer plate further having a raised face formed integral with the annular rib at the inner side thereof or at each of the outer and inner sides thereof such that the raised face abuts against the reverse side of the flange face.

17 Claims, 6 Drawing Sheets

PIPE JOINT FOR PUMP

TECHNICAL FIELD

The present invention relates to a structure of a pipe joint at each or either one of the suction and discharge opening sides of a pump produced from steel plate, for example, stainless steel plate.

BACKGROUND ART

Figure 1:
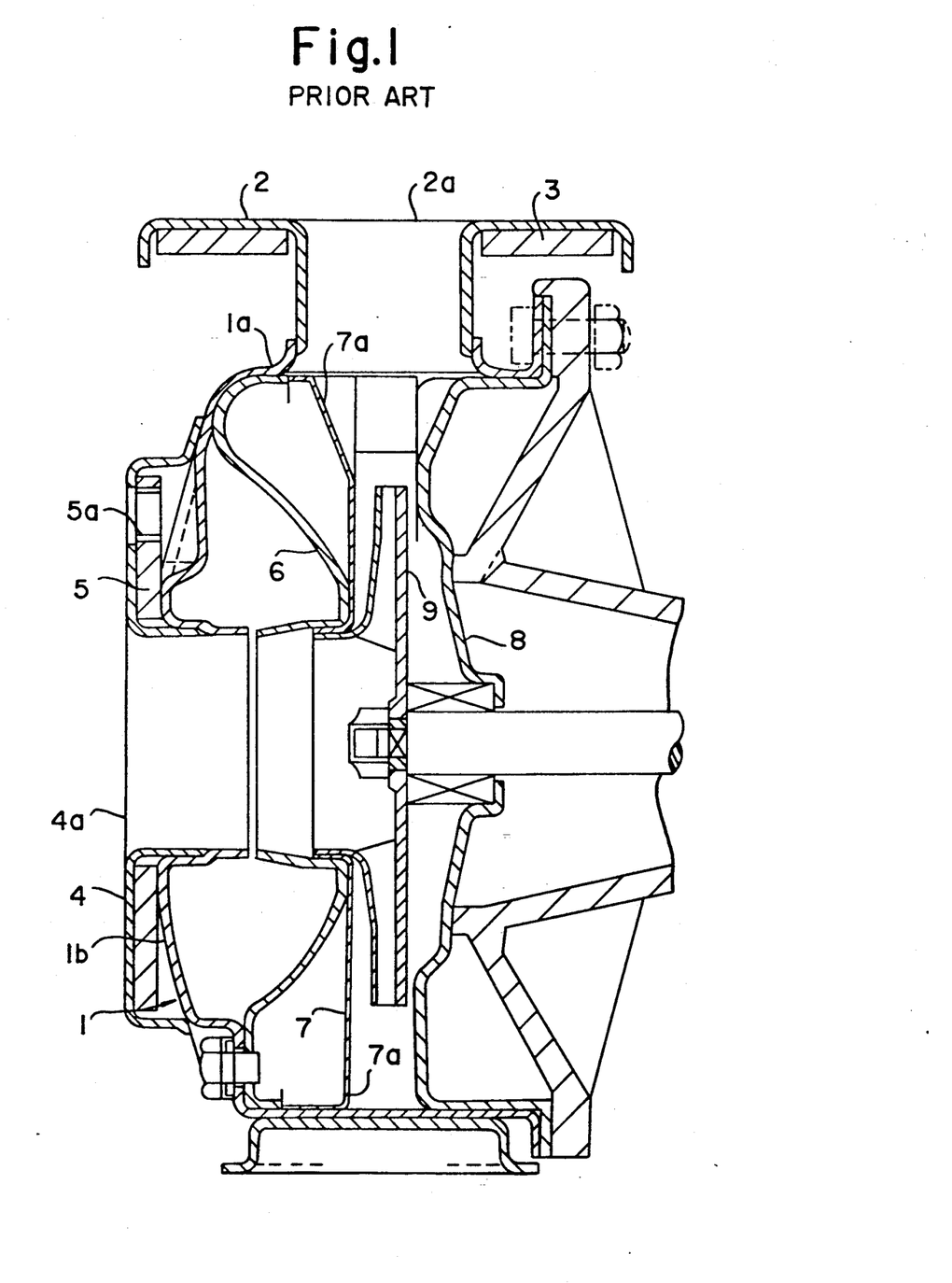
FIGS. 1 and 2 are sectional views of pumps having conventional pipe joints, respectively.

A typical conventional pipe joint of a pump produced from steel plate has a structure such as that shown in FIG. 1. At the discharge side, a pipe connecting flange 2 having a discharge opening 2a is welded to a discharge opening portion provided in the peripheral surface portion 1a of a casing body 1, and a thick-walled iron plate 3 is welded to the reverse side of the flange face of the pipe connecting flange 2.

At the suction side, on the other hand, a suction flange 4 having a suction opening 4a is welded to a suction opening portion provided in the suction-side side surface portion 1b of the casing body 1, and a thick-walled steel plate 5 having a bolt hole 5a is welded to the reverse side of the suction flange 4. It should be noted that in the figure, the reference numeral 6 denotes a suction partition plate, 7 a volute inner wall having bores 7a in the periphery thereof, 8 a casing cover, and 9 an impeller.

Figure 2:
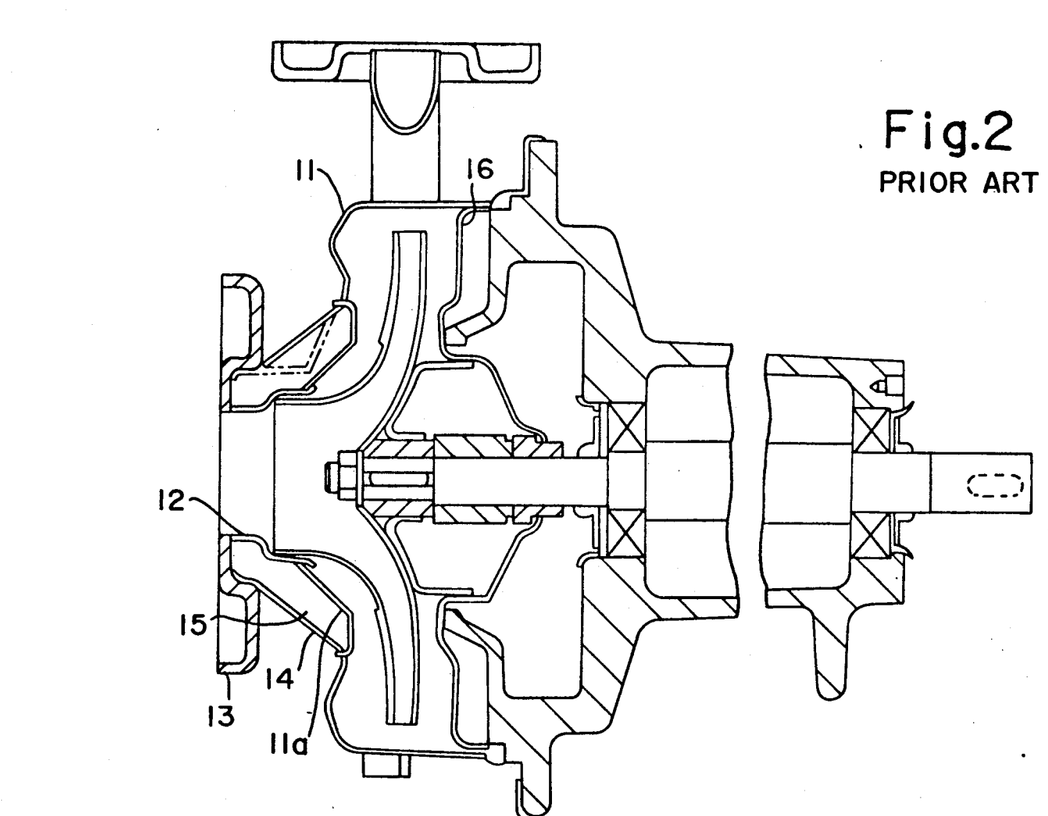

In the prior art shown in FIG. 2, a box shaped support member 15 is provided at the suction joint of a pump casing 11 formed from a thin plate (steel plate) in such a manner that the box shaped support member 15 surrounds a short suction pipe 12, the box shaped support member 15 comprising a suction-side casing wall 11a, a connecting flange 13 and a support member 14 which extends between the connecting flange 13 and the pump casing 11. In the figure, the reference numeral 16 denotes a casing end wall (see West Germany Patent Laid-Open Publication No. 3517828).

In the above-described prior art, the one (FIG. 1) in which a thick-walled steel plate is welded to the reverse side of the flange face of the pipe connecting flange has a disadvantageously high cost, although the flange face portion has a satisfactorily high strength. In the prior art (FIG. 2) in which the suction-side connecting flange 13 is supported by the support member 14 that is disposed outside the short suction pipe 12, since the whole of the connecting flange 13 having a thick wall, needs to be formed using a corrosion-resistant material and further, since the intermediary water passage (short suction pipe) 12 is also a separate member, the prior art necessitates the expenditure of a great many of man-hours and the cost is high.

In view of the above-described circumstances, it is an object of the present invention to provide a pipe joint for a pump which has a corrosion-resistant flow path and high rigidity at the flange joint surface and which is capable of preventing deformation by the application of an external force to the flange.

DISCLOSURE OF THE INVENTION

To attain the above-described object, the present invention provides the following structure for a pump pipe joint.

The pipe joint for a pump according to the invention comprises a flange body produced from a steel plate such that the inner peripheral portion thereof that defines a water passage is extended toward the casing body and secured by welding to an outlet/inlet opening in the casing body directly or through a cylindrical member, the flange body having a plurality of bolt holes provided in a flange face thereof, and a retainer plate installed in such a manner as to abut against the reverse side of the flange face, the retainer plate having an annular rib with a square outer shape and a U-shaped cross section which projects toward the casing body, the annular rib being provided in the bottom of the U-shaped cross section with a plurality of bolt holes respectively corresponding to the bolt holes in the flanges face, the retainer plate further having a raised face formed integral with the annular rib at the inner side thereof such that the raised face abuts against the reverse side of the flange face. The retainer plate may have another raised face formed integral with the annular rib at the outer side thereof such that the secondraised face abuts against the reverse side of the flange face.

The pipe joint may further comprise a reinforcing flange installed in such a manner as to abut against the bottom of the annular rib of the retainer plate. The reinforcing flange includes a cylindrical portion having a larger bore than that of the outlet/inlet opening in the casing body, an extended portion formed by radially outwardly extending the end portion of the cylindrical portion on the side thereof which is closer to the flange, the extended portion being joined to an outer cylindrical portion of the flange body, the extended portion being provided with bolt holes respectively corresponding to the bolt holes in the flange face and the retainer plate, and a casing-side end portion of the cylindrical portion which is formed in conformity with the configuration of the casing body and welded thereto.

In addition, an outwardly projecting rib may be provided on a part of the cylindrical portion of the reinforcing flange.

BEST MODE FOR CARRYING OUT THE INVENTION

The mode for carrying out the present invention will be described below with reference to the drawings.

Figure 3A:
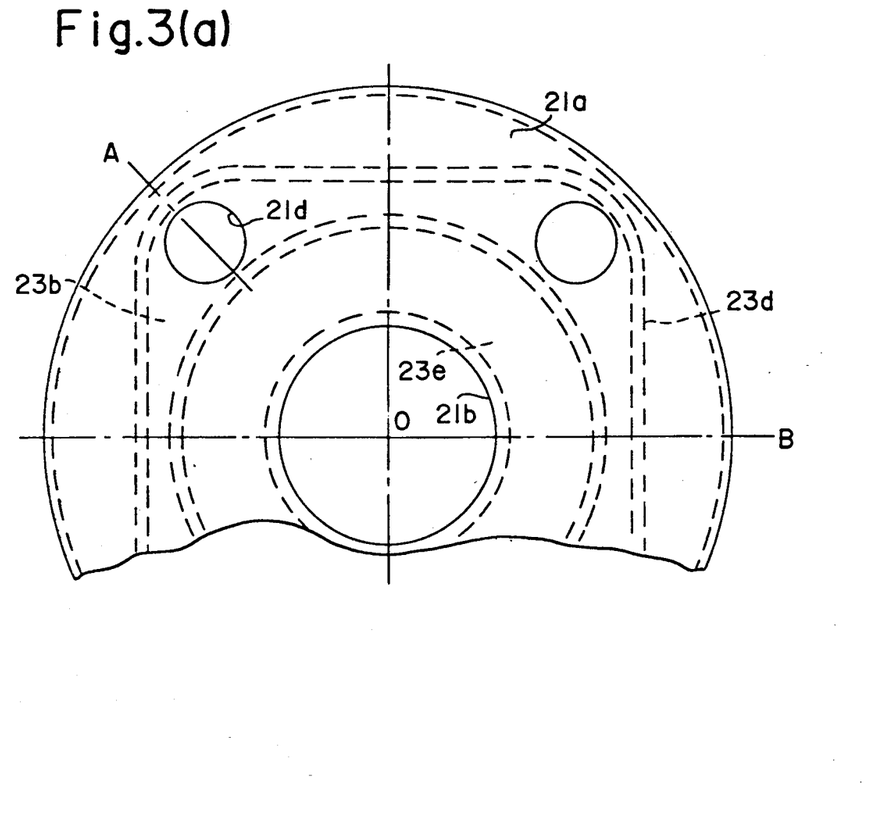
FIGS. 3(a) and 3(b) are plan and sectional views, respectively, of a pipe joint according to one embodiment of the present invention.
Figure 3B:
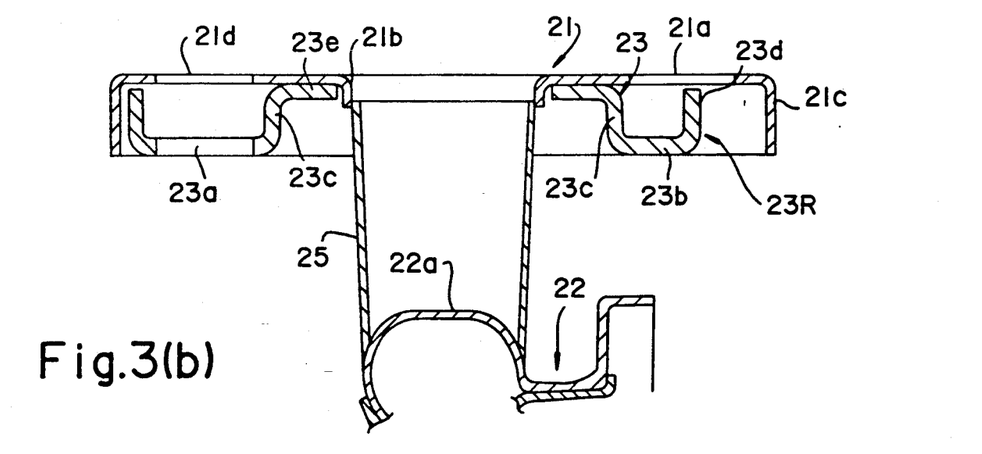

FIG. 3(a) is a plan view of a discharge-side pipe joint of a pump according to one embodiment of the present invention, and FIG. 3(b) is a sectional view taken along the line AOB of FIG. 3(a).

Referring to the figures, a flange body 21 is produced from a thin-walled corrosion-resistant steel plate. The inner peripheral portion 21b of the flange face (the surface on which an opposing flange abuts) 21a that defines a water passage extends inward from the flange face 21a and is hermetically welded to an outlet opening 22a in the casing through a substantially cylindrical discharge nozzle 25 to thereby maintain watertightness. At the outer periphery of the flange face 21a, an outer cylindrical portion 21c is formed which extends toward the casing body 22, thereby providing a reinforcing rib effect and improving the external appearance.

At the reverse side of the flange face 21a is provided a relatively thick-walled retainer plate 23 which extends from the outer side of the inner peripheral portion 21b of the flange body 21 to the outer peripheral portion which corresponds to the raised face (R.F. portion) of an ordinary flange, and the retainer plate 23 is rigidly secured to the reverse side of the flange body 21. The retainer plate 23 has an annular rib 23R with a U-shaped cross section which projects toward the casing body 22 at a portion adjacent to the raised face. The annular rib 23R comprises a planar bottom portion (the bottom of the U-shaped cross section) 23b which is provided with bolt holes 23a respectively corresponding to bolt holes 21d in the flange body 21, a cylindrical portion 23c which is provided at the radially inner side of the planar portion 23b so as to have a height substantially equal to that of the outer peripheral cylindrical portion 21c of the flange body 21, a square box-shaped portion 23d which is provided at the radially outer side of the planar portion 23b so as to have a height substantially equal to that of the outer peripheral cylindrical portion 21c, and a raised face 23e which projects radially inward from the upper end of the cylindrical portion 23c as far as a position near the inner peripheral portion 21b so as to abut against the reverse side of the flange face 21a. The raised face 23e constitutes the R.F. portion.

Although in the foregoing embodiment the discharge nozzle pipe 25 is a part which is separate from the flange body 21, it should be noted that the inner peripheral portion of the flange body 21 may be extended as far as the outlet opening 22a to form a discharge nozzle pipe portion as an integral part of the flange body 21.

Figure 4:
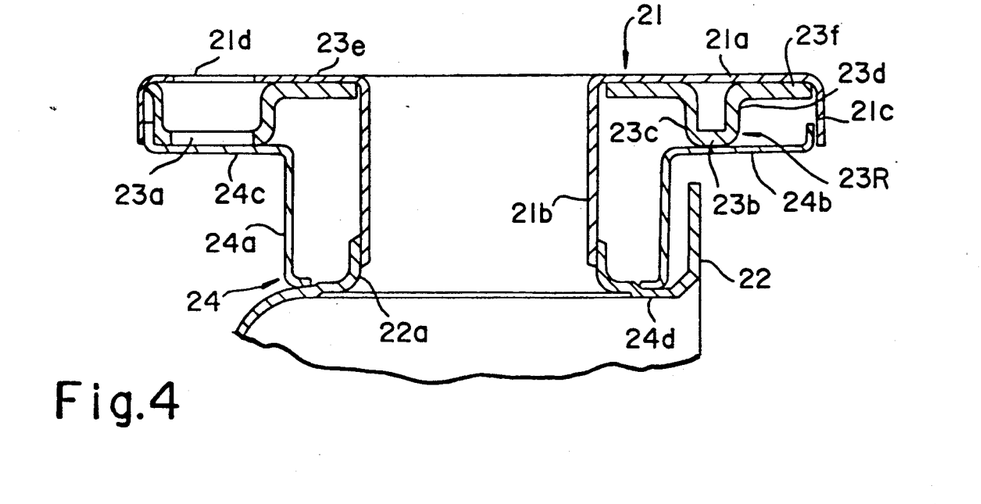
FIG. 4 is a sectional view of a pipe joint according to another embodiment of the present invention.

FIG. 4 is a sectional view [similar to that taken along the line AOB of FIG. 3(a)] of a pipe joint at the discharge side of a pump, which shows another embodiment of the present invention.

In this embodiment, the retainer plate 23 comprises a raised face 23f which projects outward from the upper end of the box-shaped portion 23d to a position near the outer cylindrical portion 21c in addition to the raised face 23e that projects as far as a position near the inner peripheral portion 21b so as to abut against the reverse side of the flange face 21a. These raised faces 23e and 23f constitute in combination the R.F. portion.

Further, a reinforcing flange 24 is installed on the reverse side of the flange body 21 so as to abut against the planar portion 23b that constitutes the bottom of the retainer plate 23. The reinforcing plate 24 has a cylindrical portion 24a which has a larger bore than that of the outlet opening 22a in the casing body 22. The cylindrical portion 24a is extended toward the flange (upward as viewed in the figure) to the same level as that of the lower end face of the retainer plate 23. The end portion of the extended cylindrical portion 24a is further extended radially outward and bent at the extremity thereof so as to be joined to the inner side of the outer cylindrical portion 21c of the flange body 21. In this state, the extended portion 24b is in contact with the lower surface of the annular rib of the retainer plate 23. The extended portion 24b is provided with bolt holes 24c respectively corresponding to the bolt holes 21d and 23a. The end portion 24d of the cylindrical portion 24a on the side thereof which is closer to the casing (i.e., the lower end portion as viewed in the figure) is formed so as to be conformable to the configuration of the casing body 22 and welded thereto.

Figure 5A:
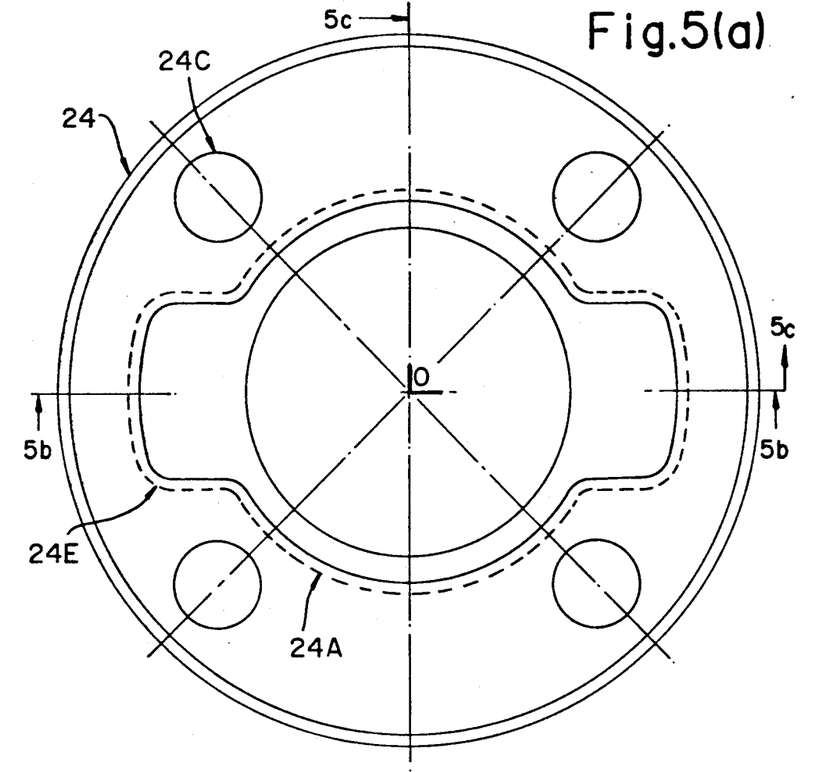
FIG. 5(a) is a plan view of a reinforcing flange.
Figure 5B:
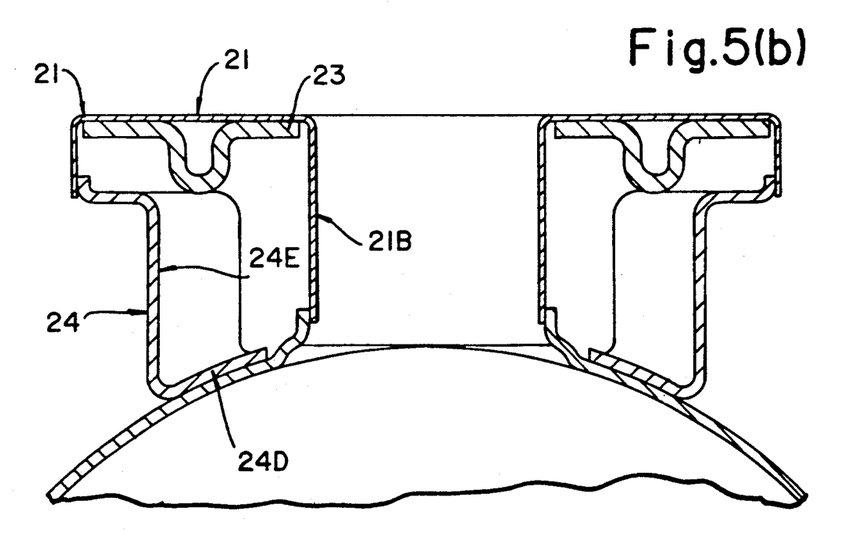
FIG. 5(b) is a sectional view showing the reinforcing flange in an installed state.
Figure 5C:
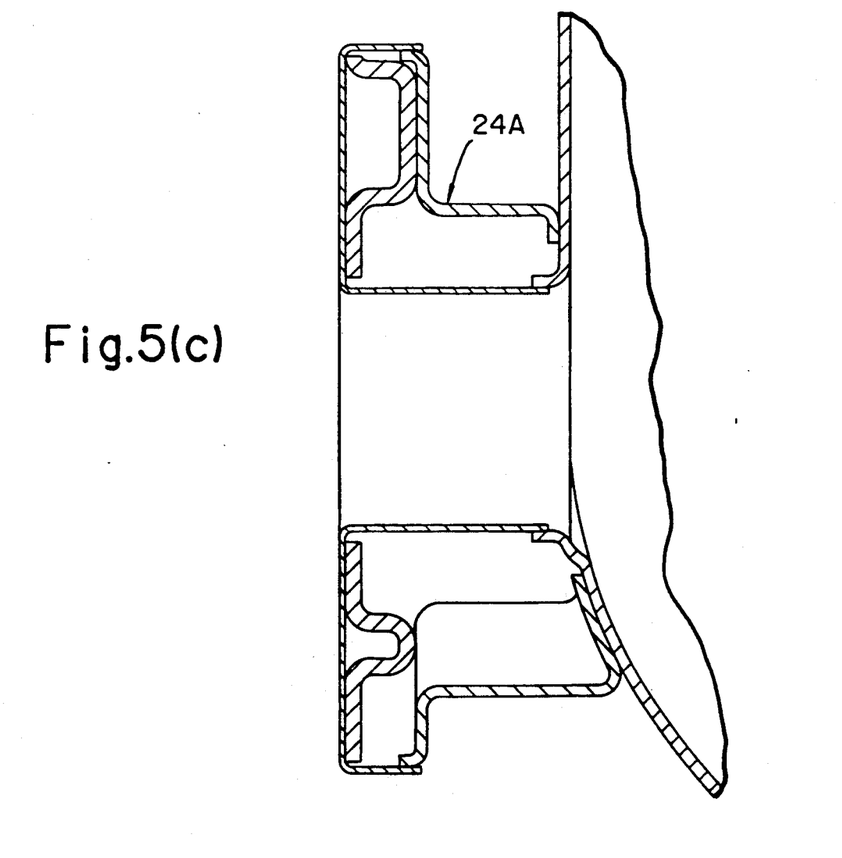
FIG. 5(c) is similar to FIG. 5(b), but shows a different sectional view.
Figure 6:
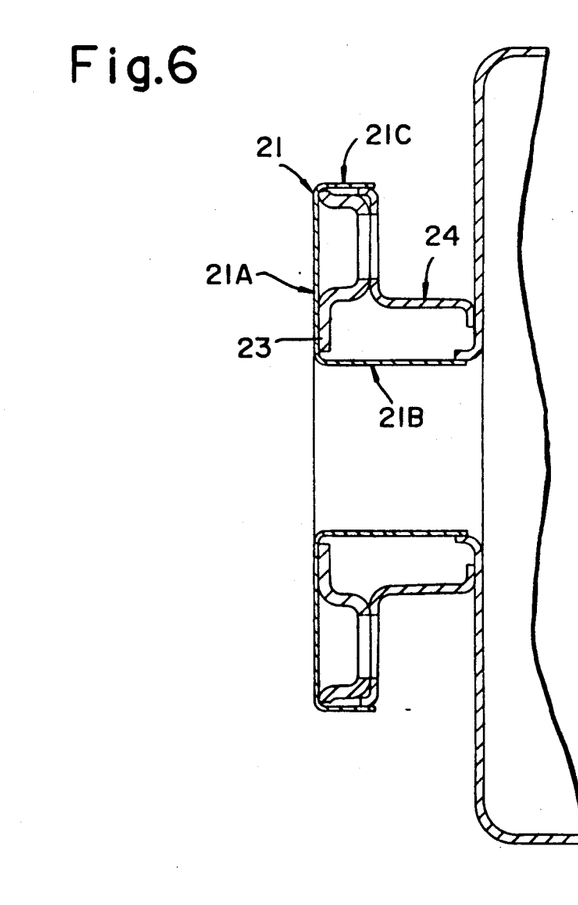
FIG. 6 is a sectional view of the flange body of the invention being connected directly to the pump casing body.
Figure 7:
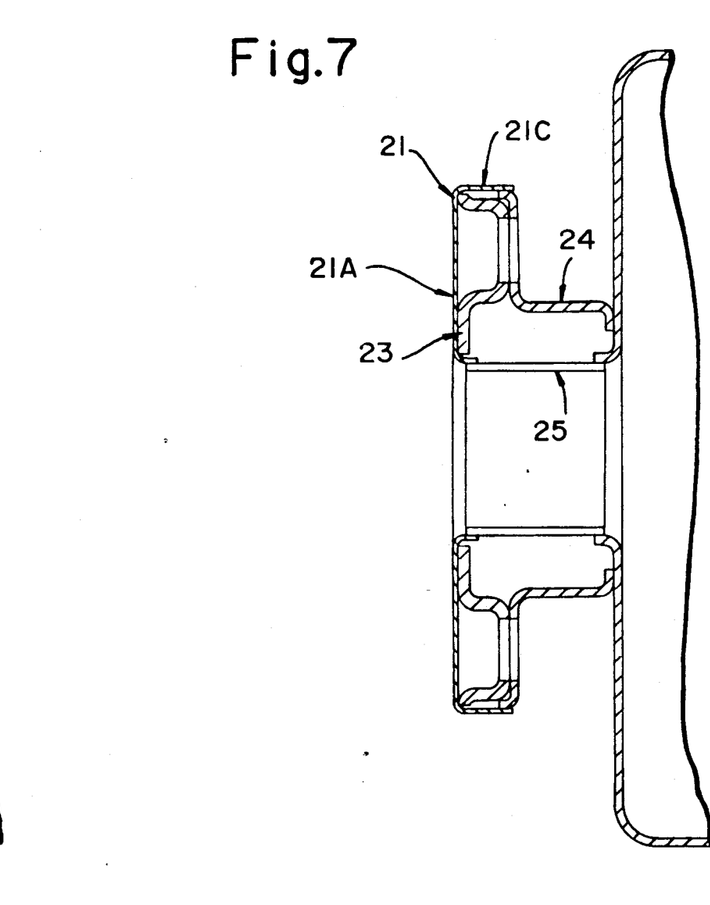
FIG. 7 is a sectional view of an embodiment of the invention with the flange body is connected to inlet opening of the casing body through a cylindrical member.

FIG. 5(a) is a fragmentary plan view of the reinforcing flange 24. FIG. 5(b) is a sectional view taken along the line COD of FIG. 5(a), and FIG. 5(c) is a sectional view taken along the line EOD. As illustrated in the figures, a part of the cylindrical portion 24a of the reinforcing flange 24 projects outward to form an outwardly projecting rib 24e.

By virtue of the above-described arrangement, in the pipe joint shown in FIG. 3(b) the raised face 23e of the retainer plate 23 which is disposed so as to abut against the reverse side of the flange face 21a of the flange body 21 when bolted functions as a reinforcing member. In the pipe joint shown in FIG. 4, the raised faces 23e and 23f of the retainer plate 23 function as reinforcing members.

Since the retainer plate 23 has as an integral part thereof an annular rib 23R having a U-shaped cross section which comprises a planar portion 23b provided with bolt holes 23a and a square box-shaped portion 23d formed at the outer side of the planar portion 23b, the edges of the box-shaped portion 23d function as ribs which prevent deformation of a portion of the retainer plate 23 which extends between each pair of adjacent bolts when the retainer plate 23 is bolted. Although torsional force also acts on the retainer plate 23 when bolted, the edges of the box-shaped portion 23d also function so as to enhance the rigidity to the torsion.

The reinforcing flange 24 that is installed on the reverse side of the flange body 21 functions so as to prevent deformation of the flange body 21 caused by the application of an external force to the flange body 21. The rib 24e that is formed on the cylindrical portion 24a of the reinforcing flange 24 further enhances the strength of the reinforcing flange 24 and hence enhances its effectiveness in preventing deformation of the flange body 21.

It should be noted that in the foregoing embodiments the cylindrical portion 23c of the retainer plate 23 need not necessarily be a circular cylinder and that it may, as a matter of course, have any cylindrical type configuration, for example, a polygonal cylinder-shaped configuration.

Although in the foregoing embodiments the pipe joint at the discharge side of a pump has been explained, the above-described pipe joint structure may be similarly applied to the suction side of a pump, as a matter of course.

As has been described above, it is possible according to the present invention to obtain the following advantageous effects.

The arrangement that a flange body is produced from a steel plate such that the inner peripheral portion thereof that defines a water passage is extended toward the casing body and secured to an outlet/inlet opening in the casing body directly or through a cylindrical member, enables corrosion resistance to be imparted to the flow path by having only the casing body or both the casing body and the cylindrical member formed from a corrosion-resistant material.

The arrangement that a retainer plate, which has an annular rib comprising a planar portion defining the bottom of a U-shaped cross section and has in the planner portion a plurality of bolt holes respectively corresponding to bolt holes provided in the flange body and a square box-shaped portion formed at the outer side of the planar portion and which further has a raised face formed integral with the annular rib at the inner side thereof or at each of the outer and inner sides thereof so as to abut against the reverse side of the flange face, is attached to the reverse side of the flange face, enables the retainer plate to function as a reinforcing member for the flange face and further enables the edges of the square box-shaped portion to function as straight reinforcing ribs for preventing deformation of a portion which extends between each pair of adjacent bolts and also serves to enhance torsional rigidity.

The arrangement that a reinforcing flange comprising a cylindrical portion having a larger diameter than an outlet/inlet opening in the casing body, an extended portion formed by outwardly extending the end portion of the cylindrical portion on the side thereof which is closer to the flange and provided with bolt holes corresponding to bolt holes in the flange face and the retainer plate, and a casing-side end portion formed in conformity with the configuration of the casing body is installed at the reverse side of the flange body, enables prevention of deformation caused by external force applied to the flange body.

Formation of a rib on the cylindrical portion of the reinforcing flange enables even more effective prevention of any deformation of the flange body.

Since portions which are contacted by pumped fluid, such as the flange body, and portions which are not contacted by pumped fluid, such as the retainer plate and the reinforcing flange, can be separated from each other, it is possible to design these two different kinds of portions in such a manner that, for the portions which are contacted by pumped fluid, greater importance is attached to corrosion resistance, whereas, for the portions which are not contacted by pumped fluid, greater importance is attached to strength. Thus, design for corrosion resistance and strength is facilitated and it is possible to effectively utilize a costly material having excellent corrosion resistance.

INDUSTRIAL APPLICABILITY

Thus, the pipe joint for a pump according to the present invention comprises a flange body produced from a steel plate such that the inner peripheral portion that defines a water passage is extended toward the casing body and secured by welding to an outlet/inlet opening in the casing body directly or through a cylindrical member, the flange body having a plurality of bolt holes provided in a flange face thereof, and a retainer plate installed in such a manner as to abut against the reverse side of the flange face, the retainer plate having an annular rib with a square outer shape and a U-shaped cross section which projects toward the casing body, the annular rib being provided in the bottom of the U-shaped cross section with a plurality of bolt holes in the flange face respectively corresponding to the bolt holes, the retainer plate further having a raised face formed integral with the annular rib at the inner side thereof or at each of the inner and outer sides thereof such that the raised face abuts against the reverse side of the flange face. Accordingly, the present invention may be suitably employed as a pipe joint for a pump wherein it is required for the flow path to be corrosion resistant and the flange joint surface needs highly rigid and a large external force acts on the flange in such a manner as to deform it.

I claim:

1. A pipe joint for a pump including a pump casing having a pipe connecting flange, comprising: a flange body produced from a steel plate such that an inner peripheral portion thereof that defines a water passage is extended toward the casing and secured by welding to an outlet opening in said casing, said flange body having a plurality of bolt holes provided in a flange face thereof; and a retainer plate installed in such a manner as to abut against a reverse side of said flange face, said retainer plate having an annular rib with a square outer shape and a U-shaped cross section which projects toward the casing, said annular rib being provided in the bottom of the U-shaped cross section with a plurality of bolt holes respectively corresponding to said bolt holes in the flange face, said retainer plate further having a raised face formed integrally with said annular rib at an inner side thereof such that said raised face abuts against the reverse side of said flange face.

2. A pipe joint for a pump according to claim 1, wherein said retainer plate has a second raised face formed integrally with said annular rib at an outer side thereof such that the second raised face abuts against the reverse side of said flange face.

3. A pipe joint for a pump according to claim 1, further comprising a reinforcing flange including a cylindrical portion having a larger bore than that of the outlet opening in the casing, an extended portion formed by radially outwardly extending an end portion of said cylindrical portion on a side thereof which is closer to the flange, said extended portion being joined to an outer cylindrical portion of the flange body, said extended portion being provided with bolt holes respectively corresponding to said bolt holes in the flange face, and a casing-side end portion of said cylindrical portion which is formed in conformity to the configuration of the casing and welded thereto, said reinforcing flange being installed in such a manner as to abut against the bottom of the annular rib of said retainer plate.

4. A pipe joint for a pump according to claim 3, wherein an outwardly projecting rib is provided on a part of the cylindrical portion of said reinforcing flange.

5. A pipe joint for a pump according to claim 2, further comprising a reinforcing flange including a cylindrical portion having a larger bore than that of the outlet opening in the casing, and an extended portion formed by radially outwardly extending the end portion of said cylindrical portion on a side thereof which is closer to the flange, said extended portion being joined to an outer cylindrical portion of the flange body, said extended portion being provided with bolt holes, and a casing-side end portion of said cylindrical portion which is formed in conformity of the casing body and welded thereto, said reinforcing flange being installed in such a manner as to abut against the bottom of the annular rib of said retainer plate.

6. A pipe joint for a pump according to claim 5, wherein an outwardly projecting rib is provided on a part of the cylindrical portion of said reinforcing flange.

7. A pipe joint for a pump including a pump casing having a pipe connecting flange, -comprising: a flange body produced from a steel plate such that an inner peripheral portion thereof that defines a water passage is extended toward the casing and secured by welding to an inlet opening in said casing, said flange body having a plurality of bolt holes provided in a flange face thereof; and a retainer plate installed in such a manner as to abut against a reverse side of said flange face, said retainer plate having an annular rib with a square outer shape and a U-shaped cross section which projects toward the casing, said annular rib being provided in the bottom of the U-shaped cross section with a plurality of bolt holes respectively corresponding to said bolt holes in the flange face, said retainer plate further having a raised face formed integrally with said annular rib at an inner side thereof such that said raised face abuts against the reverse side of said flange face.

8. A pipe joint for a pump according to claim 7, wherein said retainer plate has a second raised face formed integrally with said annular rib at an outer side thereof such that the second raised face abuts against the reverse side of said flange face.

9. A pipe joint for a pump according to claim 7, further comprising a reinforcing flange including a cylindrical portion having a larger bore than that of the inlet opening in the casing, an extended portion formed by radially outwardly extending an end portion of said cylindrical portion on a side thereof which is closer to the flange, said extended portion being joined to an outer cylindrical portion of the flange body, said extended portion being provided with bolt holes respectively corresponding to said bolt holes in the flange face, and a casing-side end portion of said cylindrical portion which is formed in conformity to the configuration of the casing and welded thereto, said reinforcing flange being installed in such a manner as to abut against the bottom of the annular rib of said retainer plate.

10. A pipe joint for a pump according to claim 9, wherein an outwardly projecting rib is provided on a part of the cylindrical portion of said reinforcing flange.

11. A pipe joint for a pump according to claim 8, further comprising a reinforcing flange including a cylindrical portion having a larger bore than that of the inlet opening in the casing, and an extended portion formed by radially outwardly extending the end portion of said cylindrical portion on a side thereof which is closer to the flange, said extended portion being joined to an outer cylindrical portion of the flange body, said extended portion being provided with bolt holes, and a casing-side end portion of said cylindrical portion which is formed in conformity of the casing body and welded thereto, said reinforcing flange being installed in such a manner as to abut against the bottom of the annular rib of said retainer plate.

12. A pipe joint for a pump according to claim 11, wherein an outwardly projecting rib is provided on a part of the cylindrical portion of said reinforcing flange.

13. A pipe joint for a pump according to claim 1, wherein said flange body is attached to said casing directly.

14. A pipe joint for a pump as recited in claim 1, wherein said flange body is attached to said casing through a cylindrical member.

15. A pipe joint for a pump according to claim 7, wherein said flange body is attached to said casing directly.

16. A pipe joint for a pump as recited in claim 7, wherein said flange body is attached to said casing through a cylindrical member.

17. A pipe joint for a pump including a pump casing having a pipe connecting flange, comprising: a flange body produced from a steel plate such that an inner peripheral portion thereof that defines a water passage is extended toward the casing and secured by welding to an outlet opening in said casing, said flange body having a plurality of bolt holes provided in a flange face thereof; a retainer plate installed in such a manner as to abut against a reverse side of said flange face, said retainer plate having an annular rib with a plurality of bolt holes respectively corresponding to said bolt holes in the flange face, said retainer plate further having a raised face formed integrally with said annular rib at an inner side thereof such that said raised face abuts against the reverse said of said flange face; and a reinforcing flange connecting said annular rib of said retainer plate with said casing.

* * * * *